(12) United States Patent
Eom (10) Patent No.: US 8,843,830 B2
(45) Date of Patent: Sep. 23, 2014

(54) SYSTEM AND METHOD OF CONTROLLING A SCREEN OF A DISPLAY DEVICE USING A MOBILE TERMINAL

(75) Inventor: YuYoul Eom, Seoul (KR)

(73) Assignee: ALTICAST Corporation, Seoul (KR)

( * ) Notice: Subject to any disclaimer, the term of this patent is extended or adjusted under 35 U.S.C. 154(b) by 7 days.

(21) Appl. No.: 13/338,700

(22) Filed: Dec. 28, 2011

(65) Prior Publication Data

US 2012/0169940 A1  Jul. 5, 2012

(30) Foreign Application Priority Data

Dec. 30, 2010  (KR) ........................ 10-2010-0139225

(51) Int. Cl.
*H04N 21/485* (2011.01)
*H04N 21/422* (2011.01)

(52) U.S. Cl.
CPC ..... *H04N 21/42224* (2013.01); *H04N 21/4858* (2013.01)
USPC ........... 715/740; 715/765; 715/788; 715/764; 715/700; 345/158; 345/173; 345/1.2; 345/734

(58) Field of Classification Search
USPC ............................................ 345/1.1, 2.1, 1.2
See application file for complete search history.

(56) References Cited

U.S. PATENT DOCUMENTS

| 2005/0223333 | A1* | 10/2005 | Yamamoto et al. | 715/765 |
| 2010/0245282 | A1* | 9/2010 | Lai | 345/174 |
| 2011/0093822 | A1* | 4/2011 | Sherwani | 715/863 |
| 2011/0154396 | A1* | 6/2011 | Kim et al. | 725/40 |
| 2011/0169976 | A1* | 7/2011 | Carter et al. | 348/222.1 |
| 2012/0200604 | A1* | 8/2012 | Imaeda et al. | 345/650 |

* cited by examiner

*Primary Examiner* — Amy Ng
*Assistant Examiner* — Sang H Kim
(74) *Attorney, Agent, or Firm* — Maier & Maier, PLLC

(57) ABSTRACT

A mobile terminal includes an image-obtaining unit configured to obtain an image including a screen displayed by a display device; a display unit configured to display the obtained image to a user; a user input unit configured to receive touch information on the display unit from the user; and a transmission unit configured to transmit screen display information about how the screen is displayed on the display unit and the touch information to a broadcast receiving terminal connected to the display device, wherein the touch information includes selection information of a first point on the display unit and movement direction information of the first point when the first point moves.

8 Claims, 5 Drawing Sheets

SYSTEM AND METHOD OF CONTROLLING A SCREEN OF A DISPLAY DEVICE USING A MOBILE TERMINAL

RELATED APPLICATIONS

This application claims the benefit of priority under 35 U.S.C. §119 to Korean Patent Application No. 10-2010-0139225 filed Dec. 30, 2010, the disclosure of which is incorporated by reference herein its entirety.

BACKGROUND OF THE INVENTION

1. Field of the Invention

Embodiments of the invention relate to a mobile terminal for remotely controlling a screen displayed on a display device and a method of controlling the screen displayed on the display device using the same.

2. Discussion of the Related Art

Since the past broadcast services were one-way, the user simply passively watched broadcast programs. However, in recent, interactive (two-way) broadcast services have been available due to development of network technology. Accordingly, the user has been able to ask separate additional services from the service provider while watching the broadcast programs.

In other word, the two-way broadcast services currently provided include not only simply watching the broadcast programs but also receiving data (additional information) directly/indirectly associated with the broadcast such as weather, news, stocks, e-mails, electric program guides (EPGs), TV shopping, banking, telephones, or internet searches.

The two-way broadcast services may be provided to the user by displaying menu for selection of the broadcast services through a TV or a display device connected to a set-top box (STB) and executing the selected menu (that is, executing the broadcast service related to the selected menu) when the user selects the displayed menu by a click or touch.

In this regard, various methods of executing a particular menu in the related art are as follows: a method that a TV or display device is equipped with a touch panel and the user directly touches the menu displayed through the TV or display device; a method that the user selects the menu using arrow keys of a remote controller; and a method that the user clicks the menu using a mobile terminal as a mouse.

However, the method that the user directly touches the screen of the display device and executes the menu has a disadvantage that it is impossible to execute the menu from a far distance. In addition, the method using the remote controller has inconvenience that the user should press the arrow keys several times to select the desired menu. And, the method using the mobile terminal as a mouse has a demerit that it is not appropriate for multi-touches because the menu should be selected while directly watching the screen displayed on the display device.

SUMMARY OF THE INVENTION

Accordingly, embodiments of the invention are directed to a mobile terminal and a method of controlling a screen on a display device using the same that substantially obviate one or more of the problems due to limitations and disadvantages of the related art.

An object of embodiments of the invention is to provide a mobile terminal for controlling a screen displayed on a TV or a display device instantly and a method of controlling the screen displayed on a display device using the same.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a mobile terminal includes an image-obtaining unit configured to obtain an image including a screen displayed by a display device; a display unit configured to display the obtained image to a user; a user input unit configured to receive touch information on the display unit from the user; and a transmission unit configured to transmit screen display information about how the screen is displayed on the display unit and the touch information to a broadcast receiving terminal connected to the display device, wherein the touch information includes selection information of a first point on the display unit and movement direction information of the first point when the first point moves.

In another aspect, a method of controlling a screen displayed by a display device using a mobile terminal including an image-obtaining unit, a display unit, a user input unit and a transmission unit includes obtaining an image including the screen using the image-obtaining unit; displaying the obtained image to a user using the display unit; receiving touch information from the user using the user input unit; and transmitting screen display information about how the screen is displayed on the display unit and the touch information to a broadcast receiving terminal connected to the display device using the transmission unit, wherein the touch information includes selection information of a first point on the display unit and movement direction information of the first point when the first point moves, and wherein the broadcast receiving terminal executes a menu contained in the screen or performs one of zooming in, zooming out, rotating and scrolling the screen on the display device using the screen display information and the touch information.

In another aspect, a record medium, in which programs of instruction languages that can be executed by a digital processing device are materially embodied to control a screen displayed on a display device using a mobile terminal that includes an image-obtaining unit, a display unit, a user input unit and a transmission unit and which can be read by the digital processing device, records the programs that performs a process comprising obtaining an image including the screen using the image-obtaining unit; displaying the obtained image to the user using the display unit; receiving touch information from the user using the user input unit, wherein the touch information includes selection information of a first point on the display unit and movement direction information of the first point when the first point moves; and transmitting screen display information about how the screen is displayed on the display unit and the touch information to a broadcast receiving terminal using the transmission unit.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Hereinafter, exemplary embodiments according to the invention will be described in detail with reference to accompanying drawings.

Figure 1:
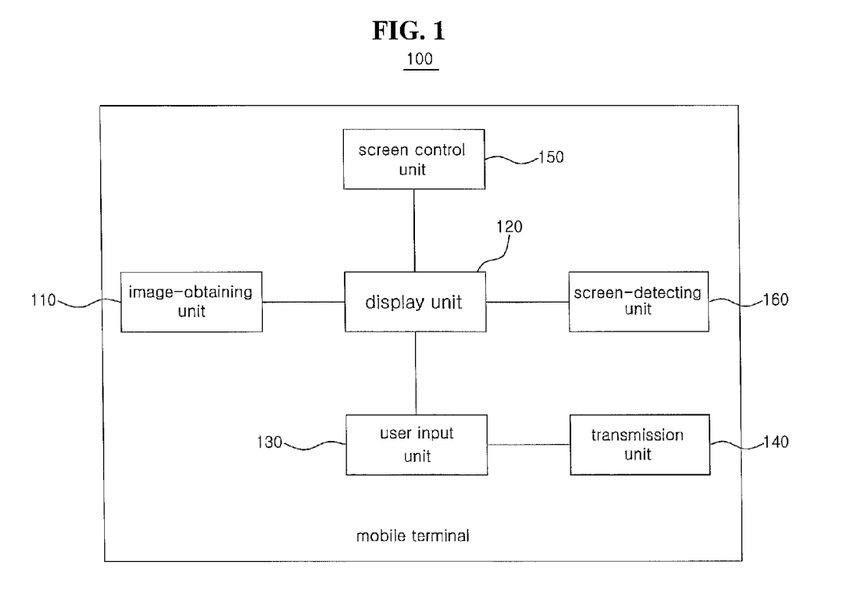
FIG. 1 is a view of illustrating a schematic configuration of a mobile terminal according to an exemplary embodiment of the invention.

FIG. 1 is a view of illustrating a schematic configuration of a mobile terminal according to an exemplary embodiment of the invention.

The mobile terminal 100 according to the exemplary embodiment of the invention may include all kinds of terminals that can be carried by a user such as smartphones, tablet personal computers (PCs), regular cell phones, personal digital assistants (PDAs), and so on. Referring to FIG. 1, the mobile terminal 100 includes an image-obtaining unit 110, a display unit 120, a user input unit 130, a transmission unit 140, a screen control unit 150 and a screen-detecting unit 160. Hereinafter, a function of each unit will be described in detail.

The image-obtaining unit 110 obtains an image including a screen displayed via a display device. For example, the image-obtaining unit 110 may include a camera equipped in the mobile terminal 100.

The display device may be connected to a broadcast receiving terminal such as a set-top box. In this case, the display device may be connected to the broadcast receiving terminal in the outside or the display device may be connected to the broadcast receiving terminal in the inside to constitute an integrated digital TV.

And, the displayed screen may be a common screen playing the broadcast program or a screen displaying at least one menu that can be selected by the user. In this case, the menu may be a menu for executing weather, news, stocks, e-mails, TV shopping, banking, telephones, or internet searches or may correspond to each broadcast program list displayed via electric program guides (EPGs).

Figure 2:
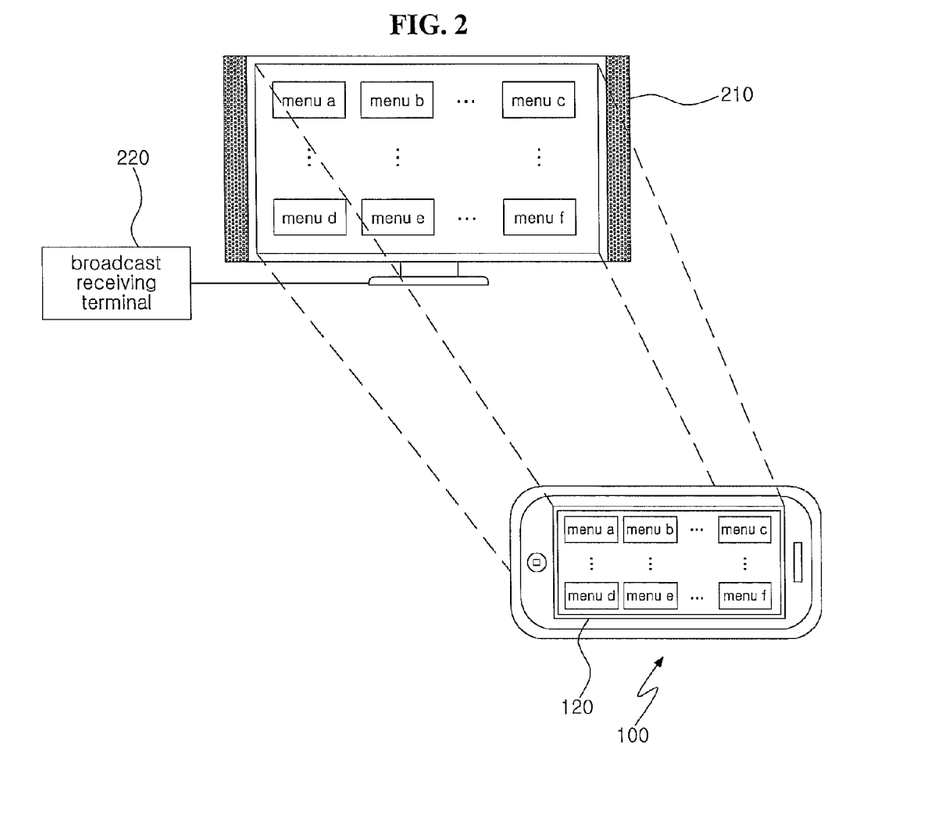
FIGS. 2 to 4 are views of showing concepts for executing a menu using a mobile terminal according to exemplary embodiments of the invention.

The display unit 120 displays the image obtained by the image-obtaining unit 110 to the user. Namely, as shown in FIG. 2, by photographing the screen displayed on the display device 210 using the mobile terminal 100, the user may obtain the image about the displayed screen including at least one menu and can confirm the relevant image through the display unit 120. Accordingly, a screen that is the same as and smaller than the screen displayed on the display device 210 is displayed through the display unit 120.

The user input unit 130 receives touch information on the display unit 120 from the user. For example, the user input unit 130 may include a touch panel that is disposed under the display unit 120.

Here, the touch information may include selection information of a specific point (hereinafter, referred to as a first point) on the display unit 120 and may include movement direction information of the first point if the selected first point moves.

That is, in case that the user touches one point (first point) on the display unit 120, the user input unit 130 obtains the selection information of the first point including location information of the first point on the display unit 120. Additionally, in case that the user touches one point (first point) on the display unit 120 and then moves the first point on the display unit 120 while touching, the user input unit 130 obtains the movement direction information of the first point.

According to an exemplary embodiment of the invention, the first point selected by the touch of the user may be more than one, and beneficially, one or two. Namely, the user input unit 130 may receive an input signal of multi-touches. When the selected first point is more than two, the selection information and the movement direction information of the first point may also be more than two.

Meanwhile, according to an exemplary embodiment of the invention, the image displayed on the display unit 120 (i.e., the image obtained by the image-obtaining unit 110) may be a still image or a moving image.

If the displayed image is a moving image, the user may select (touch) the first point while the user continuously makes the mobile terminal 100 face the display device 210.

On the contrary, if the displayed image is a still image, the user may save the still image obtained through the mobile terminal 100, and then the user may select (touch) the first point while the user watches the stored still image without positioning the mobile terminal 100 to face the display device 210. Storing the still image may be performed in accordance with the user's selection or may be automatically carried out depending on the settings.

The transmission unit 140 transmits information about a displayed type of the screen, which is contained in the obtained image, on the display unit 120 (screen display information) and the touch information obtained by the user input unit 130 to a broadcast receiving terminal 220 connected to the display device 210. Here, the screen display information means information about how the screen contained in the obtained image is output (displayed) on the display unit 120.

For example, in case that the screen contained in the obtained image is displayed through only a part of the display unit 120, the screen display information may include length/width information of the display unit 120 and location information of four angular points of a rectangle constituting the screen on the display unit 120.

As another example, in case that the screen contained in the obtained image is displayed through the whole display unit 120, the screen display information may include only the length/width information of the display unit 120.

The transmission unit 140 may transmit the screen display information and the touch information to the broadcast receiving terminal 220 using a short range transmission module.

In the meantime, the broadcast receiving terminal 220 executes the menu contained in the screen displayed on the display device 210 or performs one of zooming in, zooming out, rotating and scrolling the screen on the display device 210 using the received screen display information and touch information.

First, it will be described in more detail hereinafter that the broadcast receiving terminal 220 executes the menu contained in the screen displayed on the display device 210 using the received screen display information and touch information.

If the input signal received via the user input unit 130 is one (that is, the selected first point is one) and the first point does not move and stays, the broadcast receiving terminal 220 calculates a point on the display device 210 corresponding to the first point on the display unit 120 (hereinafter, referred to as a second point) using the screen display information and the selection information of the first point (that is, the location information of the first point on the display unit 120) and selects and executes the menu displayed at the second point from at least one menu displayed on the display device 210. Here, executing a menu means providing a broadcast service corresponding to the selected menu.

In other words, the broadcast receiving terminal 220 checks which menu is selected on the mobile terminal 100 by the user using the screen display information and the location information of the first point, calculates the second point at which the same menu as one selected on the mobile terminal 100 from the menu displayed on the display device 210 is located, and executes the menu located at the second point. Accordingly, the broadcast service corresponding to the menu selected on the display unit 120 is provided.

For example, in case that the screen contained in the obtained image is displayed to the user through the whole display unit 120, the broadcast receiving terminal 220 may receive the length/width information of the display unit 120 and coordinate information of the first point on the display unit 120 and may calculate the second point corresponding to the first point using the ratio of the length/width of the display unit 120 and the length/width of the display device 210.

Figure 3:
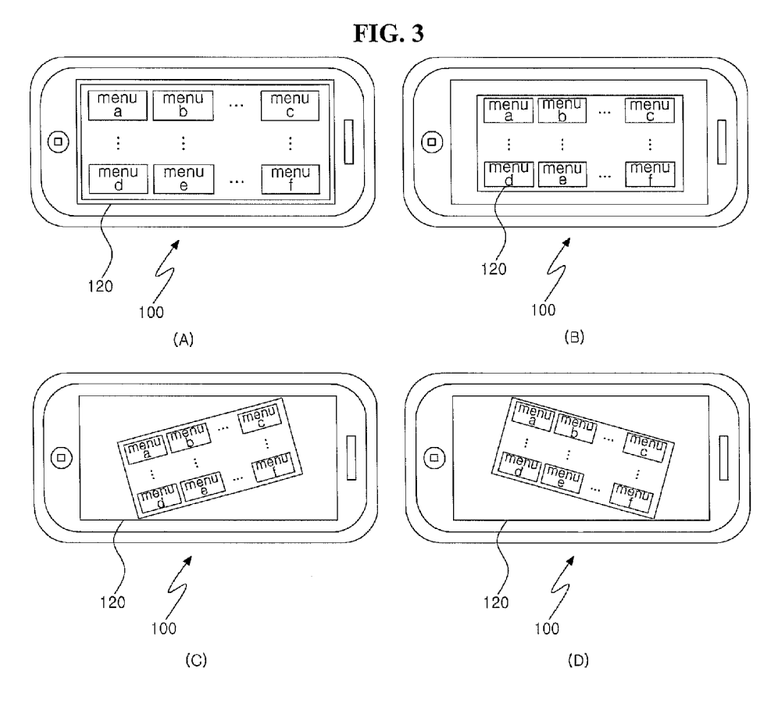

Meanwhile, the screen in the image obtained by the image-obtaining unit 110 may be displayed via the whole display unit 120 as shown in FIG. 3(*a*) or may be displayed via a part of the display unit 120 as shown in FIG. 3(*b*). In addition, the screen in the obtained image may be displayed to form a slant angle with respect to the display unit 120 as shown in FIGS. 3(*c*) and 3(*d*).

Like this, even though the screen contained in the image is displayed via the part of the display unit 120 or is displayed on a slant, the mobile terminal 100 may transmit the length/width information of the display unit 120 and the location information about the angular points of the screen on the display unit 120, and thus the broadcast receiving terminal 220 may calculate the second point on the display device 210 corresponding to the first point. However, this needs a more complicated computing process.

Therefore, according to an exemplary embodiment of the invention, the mobile terminal 100 may display the screen via the whole display unit 120 before the user selects a specific menu, and the user may select the first point on the screen displayed via the whole display unit 120 to thereby control the amount of computation needed in detecting the second point on the display device 210. To do this, the mobile terminal 100 comprises the screen control unit 150 and the screen-detecting unit 160.

More particularly, the screen control unit 150 controls the length/width of the screen on the display unit 120 or a degree of rotation of the screen. At this time, the screen control unit 150 may adjust the length/width of the screen on the display unit 120 or the degree of rotation of the screen so that the screen in the image is displayed via the whole display unit 120 as stated above.

In addition, to detect the screen in the image, the screen-detecting unit 160 may detect the angular points of the screen having a rectangle/square shape in the obtained image. In this case, the screen control unit 150 may adjust the length/width of the screen or the degree of rotation of the screen based on the detected angular points to thereby display the screen via the whole display unit 120.

Next, it will be described in more detail hereinafter to zoom in, zoom out, rotate and scroll the screen displayed on the display device 210 using the screen display information or touch information received by the broadcast receiving terminal 220.

Figure 4:
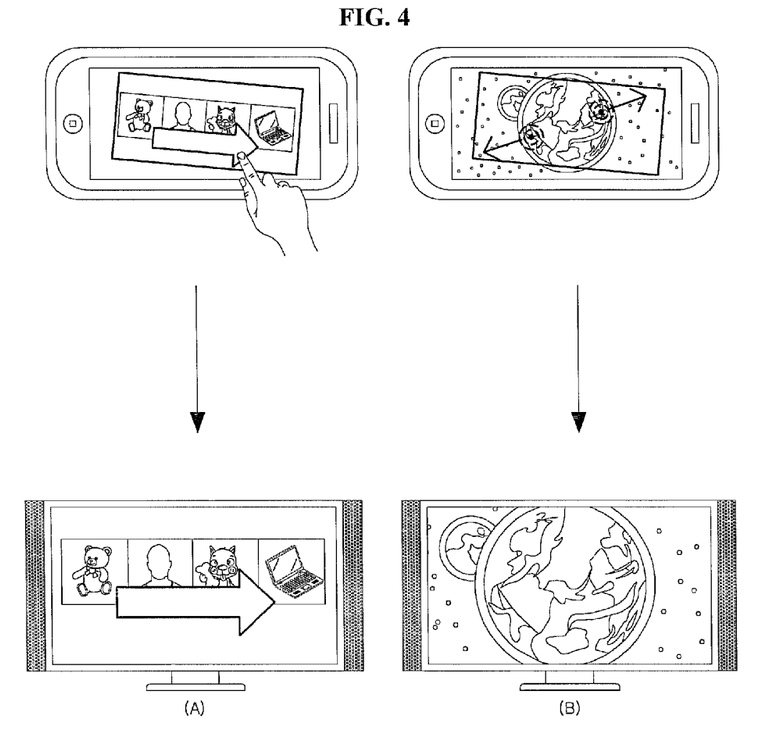

As shown in FIG. 4(*a*), if the input signal received by the user input unit 130 is one (that is, the selected first point is one) and the first point moves, the broadcast receiving terminal 220 can scroll the screen on the display device 210 in the same direction as the movement direction of the first point on the display unit 120 using the screen display information, the selection information of the first point, and the movement direction information of the first point.

Additionally, as shown in FIG. 4(*b*), if the input signal received by the user input unit 130 is two (that is, the selected first point is two) and at least one of the two first points moves, the broadcast receiving terminal 220 can zoom in or zoom out the size of the screen on the display device 210 using the screen display information, the selection information of the first point, and the movement direction information of the first point.

More particularly, when the two first points become more distant from each other due to movement of at least one of the two first points, the broadcast receiving terminal 220 may zoom in the screen on the display device 210, and when the two first points get closer to each other, the broadcast receiving terminal 220 may zoom out the screen on the display device 210.

Additionally, if the input signal received by the user input unit 130 is two (that is, the selected first point is two) and one of the two first points does not move while the other of the two first points moves maintaining a certain distance with the one of the two first points, the broadcast receiving terminal 220 can rotate the screen on the display device 210 toward the movement direction of the other of the two first points.

And, when the input signal received via the user input unit 130 is three (that is, the selected first point is three) and three points move, the broadcast receiving terminal 220 can output the menu for performing a specific action or proving a certain service on the display device 210.

Additionally, in case that the input signal received via the user input unit 130 is four (that is, the selected first point is four) and four points move, the broadcast receiving terminal 220 can perform a history back function for providing a list of broadcast programs that the user has previously watched.

In short, by using the mobile terminal 100 according to an exemplary embodiment of the present invention, the user can select and execute the broadcast services provided by the display device 210 and the broadcast receiving terminal 220 or can zoom in/zoom out, rotate or scroll the displayed screen from a remote place more than a predetermined distance in accordance with immediate ways. In addition, since the user can control the displayed screen from the remote place using a common mobile device, additional costs (devices) for the remote control are not required.

Figure 5:
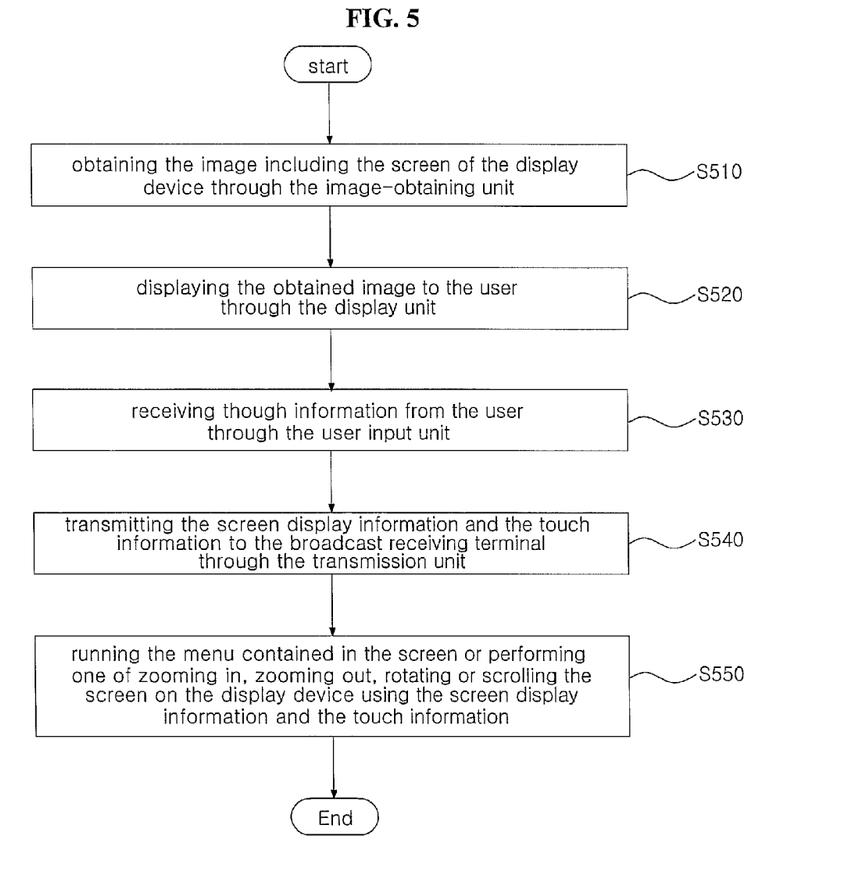
FIG. 5 is a flow chart of illustrating a method of executing a menu of a display device using a mobile terminal according to an exemplary embodiment of the invention.

FIG. 5 is a flow chart of illustrating a method of controlling the screen displayed on the display device using the mobile terminal 100 according to an exemplary embodiment of the invention. Hereinafter, a process performed at each step will be described.

First, at step S510, the image including the screen of the display device 210 is obtained by the image-obtaining unit 110. At step S520, the obtained image is displayed to the user through the display unit 120.

Next, at step S530, the touch information is received from the user via the user input unit 130. Here, the touch information includes the selection information of the first point on the display unit 120 and the movement direction information of the first point when the first point moves.

Subsequently, at step S540, the information about a displayed type of the screen on the display unit 120 (screen display information) and the touch information are transmitted to the broadcast receiving terminal 220 through the transmission unit 140.

Then, the broadcast receiving terminal 220 executes the menu included in the screen or performs one of zooming in, zooming out, rotating and scrolling the screen on the display device 210 using the received screen display information and touch information.

So far, the embodiments about methods of controlling the screen displayed on the display device using the mobile terminal according to the invention have been described. The configuration of the mobile terminal 100 of FIG. 1 can be applied to the embodiments of the invention. Thus, more detail explanations will be omitted.

In addition, the embodiments of the invention may be realized as program instructions that can be performed via various digital processing devices and may be recorded to the computer-readable recording media. The computer-readable recording media may include program instructions, data files or data structures singly or in combination. The program instructions recorded in the recording media may be specially designed and constructed for the invention or may be known or available to one of ordinary sill in the computer software art. The computer-readable recording media may be magnetic media such as hard disks, floppy disks and magnetic tapes, optical media such as CD-ROM and DVD, magneto-optical media such as floptical disk, and computer data storages such as ROM, RAM and flash memories, for example. The program instructions may include not only machine language codes created by compiles but also high-level language codes that can be executed by a computer using interpreters, for example. The above-mentioned hardware devices may be constructed to operate as at least one software module for performing the operations in the embodiments of the invention, and vice versa.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A mobile terminal, the mobile terminal comprising:
a camera configured to obtain an image including a screen displayed by an external display device;
an internal display device in communication with the camera, configured to display the obtained image to a user;
a user input device in communication with the internal display device, configured to receive touch information on the internal display device from the user;
a screen-detecting device in communication with the camera, configured to detect angular points of the screen in the obtained image;
a screen control device in communication with the screen-detecting device, configured to adjust a length/width of the screen on the internal display device and a degree of rotation of the screen based on the detected angular points such that the screen is displayed through the whole internal display device; and
a transmission device in communication with the screen control device and the user input device, configured to transmit screen display information about how the screen is displayed on the internal display device and the touch information to a broadcast receiving terminal connected to the external display device,
wherein the touch information includes selection information of a first point on the internal display device and movement direction information of the first point when the first point moves,
wherein the screen display information includes length/width information of the internal display device and location information of angular points of the screen on the internal display device, and wherein the selection information of the first point includes location information of the first point on the internal display device.

2. The mobile terminal according to claim 1, wherein the broadcast receiving terminal executes a menu contained in the screen or performs one of zooming in, zooming out, rotating and scrolling the screen on the external display device using the screen display information and the touch information.

3. The mobile terminal according to claim 2, wherein when the first point is one and the first point does not move, the broadcast receiving terminal calculates a second point on the external display device corresponding to the first point and executes a menu displayed at the second point on the external display device.

4. The mobile terminal according to claim 2, wherein when the first point is one and the first point moves, the broadcast receiving terminal scrolls the screen on the external display device in a same direction as a movement direction of the first point using the movement direction information of the first point.

5. The mobile terminal according to claim 2, wherein when the first point is two and the two first points become more distant from each other due to movement of at least one of the two first points, the broadcast receiving terminal zooms in the screen on the external display device, and when the first point is two and the two first points get closer to each other due to movement of at least one of the two first points, the broadcast receiving terminal zooms out the screen on the external display device.

6. The mobile terminal according to claim 1, wherein the obtained image is a still image or a moving image.

7. A method of controlling a screen displayed by a display device using a mobile terminal including an image-obtaining unit, a display unit, a user input unit and a transmission unit, the method comprising:
obtaining an image including the screen using the image-obtaining unit;
displaying the obtained image to a user using the display unit;
detecting angular points of the screen in the obtained image;
adjusting a length/width of the screen on the display unit and a degree of rotation of the screen based on the angular points such that the screen is displayed through the whole display unit;
receiving touch information from the user using the user input unit; and
transmitting screen display information about how the screen is displayed on the display unit and the touch information to a broadcast receiving terminal connected to the display device using the transmission unit, wherein the touch information includes selection information of a first point on the display unit and movement direction information of the first point when the first point moves, wherein the screen display information includes length/width information of the display unit and location information of angular points of the screen on the display unit, and wherein the selection information of the first point includes location information of the first point on the display unit, wherein the broadcast receiving terminal receives the length/width information of the display unit and coordinate information of the first point on the display unit from the mobile terminal, calculates the second point corresponding to the first point using the ratio of the length/width of the display unit and the length/width of the display device and executes a menu contained in the screen or performs one of zooming in, zooming out, rotating and scrolling the screen on the display device using the screen display information and the touch information.

8. A computer-readable non-transitory storage, in which programs of instruction languages that can be executed by a digital processing device are materially embodied to control a screen displayed on a display device using a mobile terminal that includes an image-obtaining unit, a display unit, a user input unit and a transmission unit and which can be read by the digital processing device, the record medium recording the programs that performs a process comprising:

obtaining an image including the screen using the image-obtaining unit;

displaying the obtained image to the user using the display unit;

detecting angular points of the screen in the obtained image;

adjusting a length/width of the screen on the display unit and a degree of rotation of the screen based on the angular points such that the screen is displayed through the whole display unit;

receiving touch information from the user using the user input unit, wherein the touch information includes selection information of a first point on the display unit and movement direction information of the first point when the first point moves; and transmitting screen display information about how the screen is displayed on the display unit and the touch information to a broadcast receiving terminal using the transmission unit, wherein the touch information includes selection information of a first point on the display unit and movement direction information of the first point when the first point moves, wherein the screen display information includes length/width information of the display unit and location information of angular points of the screen on the display unit, and wherein the selection information of the first point includes location information of the first point on the display unit, wherein the broadcast receiving terminal receives the length/width information of the display unit and coordinate information of the first point on the display unit from the mobile terminal, calculates the second point corresponding to the first point using the ratio of the length/width of the display unit and the length/width of the display device and executes a menu contained in the screen or performs one of zooming in, zooming out, rotating and scrolling the screen on the display device using the screen display information and the touch information.

* * * * *